(12) United States Patent
Liu et al.

(10) Patent No.: US 12,130,379 B2
(45) Date of Patent: Oct. 29, 2024

(54) OBJECT RECOGNITION METHOD AND OBJECT RECOGNITION DEVICE

(71) Applicant: RichWave Technology Corp., Taipei (TW)

(72) Inventors: Wei-Min Liu, Taipei (TW); Po-Fu Wan, Taipei (TW); Han-Jieh Chang, Taipei (TW); Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 344 days.

(21) Appl. No.: 17/332,995

(22) Filed: May 27, 2021

(65) Prior Publication Data

US 2022/0003837 A1 Jan. 6, 2022

(30) Foreign Application Priority Data

Jul. 1, 2020 (TW) ................. 109122246

(51) Int. Cl.
*G01S 7/35* (2006.01)
*G01S 7/41* (2006.01)
*G01S 13/56* (2006.01)
*G01S 13/62* (2006.01)

(52) U.S. Cl.
CPC .............. *G01S 7/354* (2013.01); *G01S 7/356* (2021.05); *G01S 7/415* (2013.01); *G01S 13/56* (2013.01); *G01S 13/62* (2013.01)

(58) Field of Classification Search
CPC .......... G01S 7/354; G01S 7/356; G01S 7/415; G01S 13/56; G01S 13/62
See application file for complete search history.

(56) References Cited

U.S. PATENT DOCUMENTS

| | | | |
|---|---|---|---|
| 2015/0301169 A1 | 10/2015 | De Pasquale | |
| 2017/0343671 A1* | 11/2017 | de Mersseman | ..... G01S 17/931 |
| 2017/0371074 A1 | 12/2017 | Elkabetz | |
| 2018/0120420 A1 | 5/2018 | McMahon | |
| 2018/0252806 A1* | 9/2018 | Miranda | ............... G01S 7/2813 |
| 2018/0348402 A1 | 12/2018 | Elkabetz | |

(Continued)

FOREIGN PATENT DOCUMENTS

| | | | | |
|---|---|---|---|---|
| CN | 104142499 A | * | 11/2014 | ........... G01S 13/887 |
| CN | 112741617 A | * | 5/2021 | |

(Continued)

OTHER PUBLICATIONS

17332995_2023-06-27_EP_3695783_A1_M.pdf, machine translation of EP_3695783_A1 (Year: 2014).*

(Continued)

*Primary Examiner* — Timothy A Brainard
*Assistant Examiner* — Kenneth W Good
(74) *Attorney, Agent, or Firm* — Winston Hsu

(57) ABSTRACT

An object recognition method includes generating Doppler spectrogram data according to an echo signal, the echo signal being relating to an object; transforming N sets of time-domain data of the Doppler spectrogram data corresponding to N velocities into N sets of cadence spectrogram data, respectively; combining the N sets of spectrogram data to obtain 1D/2D cadence spectrum data, and acquiring a series of cadence feature from the 1D/2D cadence spectrum data to recognize the object.

18 Claims, 12 Drawing Sheets

(56) References Cited

U.S. PATENT DOCUMENTS

| | | | |
|---|---|---|---|
| 2019/0310362 A1* | 10/2019 | Yan | G01S 7/415 |
| 2020/0285926 A1* | 9/2020 | Bush | G06K 19/0723 |
| 2020/0334452 A1* | 10/2020 | Gurbuz | G01S 7/354 |
| 2021/0208272 A1* | 7/2021 | Lavian | H03L 7/091 |
| 2021/0282667 A1* | 9/2021 | Pasupuleti | A61B 5/112 |
| 2021/0396843 A1* | 12/2021 | Santra | G01S 7/415 |

FOREIGN PATENT DOCUMENTS

| | | | | |
|---|---|---|---|---|
| EP | 3695783 A1 * | 8/2020 | | A61B 5/0022 |
| TW | 201405156 A | 2/2014 | | |
| TW | 201546474 A | 12/2015 | | |
| TW | 201823767 A | 7/2018 | | |
| TW | 201902425 A | 1/2019 | | |
| TW | 202018323 A | 5/2020 | | |
| TW | 202018326 A | 5/2020 | | |
| WO | WO-2020234962 A1 * | 11/2020 | | G01S 13/589 |

OTHER PUBLICATIONS

17332995_2023-06-23_CN_104142499_A_M.pdf, machine translation of CN-104142499-A (Year: 2020).*

17332995_2023-06-30_CN_112741617_A_M.pdf, machine translation of CN-112741617-A (Year: 2021).*

17332995_2023-06-30_WO_2020234962_A1_M.pdf, machine translation of WO-2020234962-A1 (Year: 2020).*

\* cited by examiner

OBJECT RECOGNITION METHOD AND OBJECT RECOGNITION DEVICE

CROSS REFERENCE TO RELATED APPLICATION

This non-provisional application claims priority of Taiwan patent application No. 109122246, filed on Jul. 1, 2020, included herein by reference in its entirety.

TECHNICAL FIELD

The invention relates to an object recognition method, in particular to an object identification method and an object identification device using a radar.

BACKGROUND

Biometrics is a crucial technology for identifying humans, animals and other organisms, and has been widely adopted in the field of intrusion detection. The applications of radar in object recognition have been growing owing to radar's performance not being affected by the night environment, harsh environment and poor lighting environment. The radar can estimate the size of the target object within a range, and use Doppler effect to measure the velocity of the target object according to the frequency shift between the transmitted wave and the reflected wave. However, relying on the size and velocity of the target object to distinguish the target object imposes limitations on the accuracy and recognition speed of the target.

SUMMARY

According to one embodiment of the invention, the object recognition method includes generating Doppler spectrogram data according to an echo signal associated with an object, transforming N sets of time domain data corresponding to N velocities in the Doppler spectrogram data into N sets of cadence spectrum data, respectively, N being a positive integer, combining the N sets of spectrum data to acquire 1D/2D cadence spectrum data, and acquiring a cadence feature from the 1D/2D cadence spectrum data to recognize the object.

According to another embodiment of the invention, the object recognition device includes a radar and a processor. The radar is used to receive an echo signal, the echo signal being associated with an object. The processor is coupled to the radar, and is used to generate Doppler spectrogram data according to the echo signal, transform N sets of time domain data corresponding to N velocities in the Doppler spectrogram data into N sets of cadence spectrum data, respectively, combine the N sets of spectrum data to acquire 1D/2D cadence spectrum data, and acquire a cadence feature from the 1D/2D cadence spectrum data to recognize the object, N being a positive integer.

DETAILED DESCRIPTION

Figure 1:
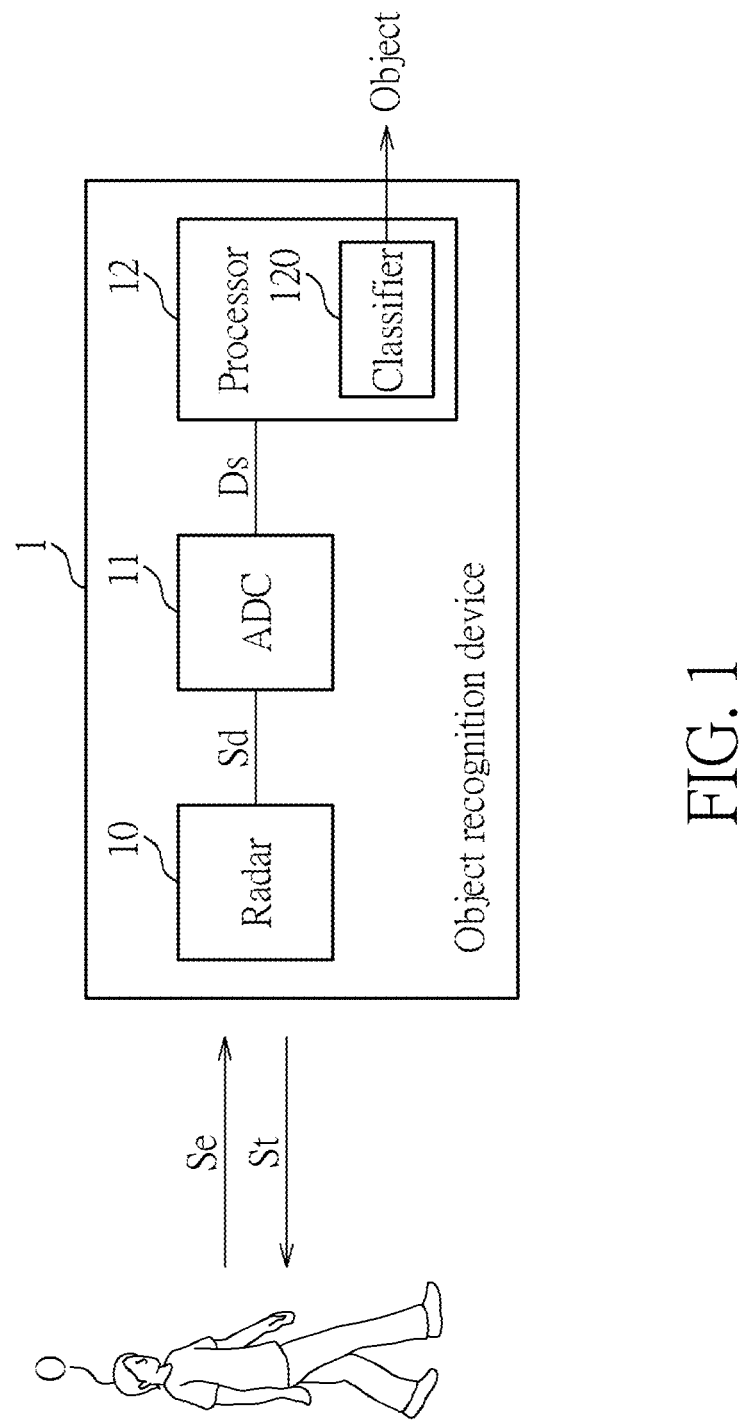
FIG. 1 is a block diagram of an object recognition device according to an embodiment of the invention.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a block diagram of an object recognition device 1 according to an embodiment of the invention. The object recognition device 1 may recognize an object 0. The recognized object O may be a person, a dog, a cat, an animal or other moving objects. Since different people or animals may walk in different posture patterns, and different objects may move in specific patterns, referred to as cadence features, the object recognition device 1 may recognize the object O based on the cadence features thereof. The cadence features may be the speed and the moving direction of a torso, the swing speed and the swing direction of a limb, the swing speed and the swing direction of another attached object, the flapping of a wing of a bird, the rotation of a fan, or the vibration of an engine. The object recognition system 1 may include an antenna 10, an analog to digital converter (ADC) 11 and a processor 12. The radar 10 is coupled to the processor 12 via the ADC 11. Upon transmitting a transmission signal St, the radar 10 may detect an echo signal Se associated with the movement of the object O. The processor 12 may process the echo signal Se to obtain the cadence features of the object O, and recognize the object O by way of classification according to the cadence features.

The radar 10 may be a continuous wave radar, a frequency modulated continuous wave radar or other types of radars. The radar 10 may send out the transmission signal St, and receive the echo signal Se when an object O is detected. The transmission signal St has a predetermined frequency. When the object O is in motion, the relative radial movement between the object O and the radar 10 will cause the frequency of the echo signal Se to shift, referred to as the Doppler shift. Since the radar may be fixed in position and the Doppler shift is related to the velocity of the relative motion, when the object O is in motion, the Doppler shift may be used to estimate the velocity of the object O, expressed by Equation 1 as follows:

$$v = \frac{c * fd}{2ft}$$ Equation 1 where v is the velocity of the object O;
c is the speed of light;
ft is the frequency of the transmission signal St; and
fd is equal to the frequency of the echo signal Se minus ft, and is referred to as the
Doppler frequency.

When the object O moves directly toward the radar 10, the velocity v of the object O is proportional to the Doppler frequency fd. When the object O gradually approaches the radar 10, the velocity v of the object O is positive and the Doppler frequency fd is positive; and when the object O gradually moves away from the radar 10, the velocity v of the object O is negative and the Doppler frequency fd is negative. The echo signal Se may include at least one frequency. In some embodiments, the radar 10 may mix the echo signal Se and the transmission signal St to generate a Doppler signal Sd including at least one Doppler frequency fd. The ADC 11 may use a specific sampling frequency, e.g., 44100 Hz to sample the Doppler signal Sd to generate a plurality of sampling data Ds. The processor 12 may perform preprocessing on the plurality of sampling data Ds to generate a plurality of preprocessed data, and segment the plurality of preprocessed data into M segments to perform a discrete frequency transform thereon to sequentially generate energy distributions for M sets of frequencies. The energy distribution of each set of frequencies corresponds to a range of the Doppler frequencies fd in frequency domain, and may form a set of energy spectrum. M is a positive integer. In this embodiment, the preprocessed data of the M segments may partially overlap with each other. Since the Doppler frequencies fd in the Doppler signal Sd may be converted into the energy distribution of M sets of frequencies, the processor 12 may use Equation 1 to convert the sampling results of the M sets of frequencies in the Doppler signal Sd into M sets of velocities. Here, after the conversion of Equation 1, the data of the M sets of velocities may be regarded as Doppler spectrogram data, and the Doppler spectrogram data may include M sets of Doppler spectrum data in M time intervals. The processor 12 may perform a discrete frequency transform on the Doppler spectrogram data again to generate cadence spectrum data, and extract the cadence features of the object O from the cadence spectrum data. The discrete frequency transform may be implemented by a fast Fourier transform. The processor 12 may include a classifier 120 to identify the object O according to the cadence features. The classifier 120 may be implemented by a support vector machine (SVM) algorithm, a K-nearest neighbors (KNN) algorithm, or a linear discriminant analysis algorithm, other classification algorithms or a combination thereof. The Doppler spectrogram data, a time-frequency representation, may be derived from a short-time Fourier transform, a wavelet transform, a Hilbert-Huang Transform, or a combination thereof. In some embodiments, an independent time-frequency transform circuit may be used to perform time-frequency representation derivation on the M segments of preprocessed data, and/or an independent discrete frequency transform circuit may be used to transform the Doppler spectrogram data into cadence spectrum data.

Figure 2:
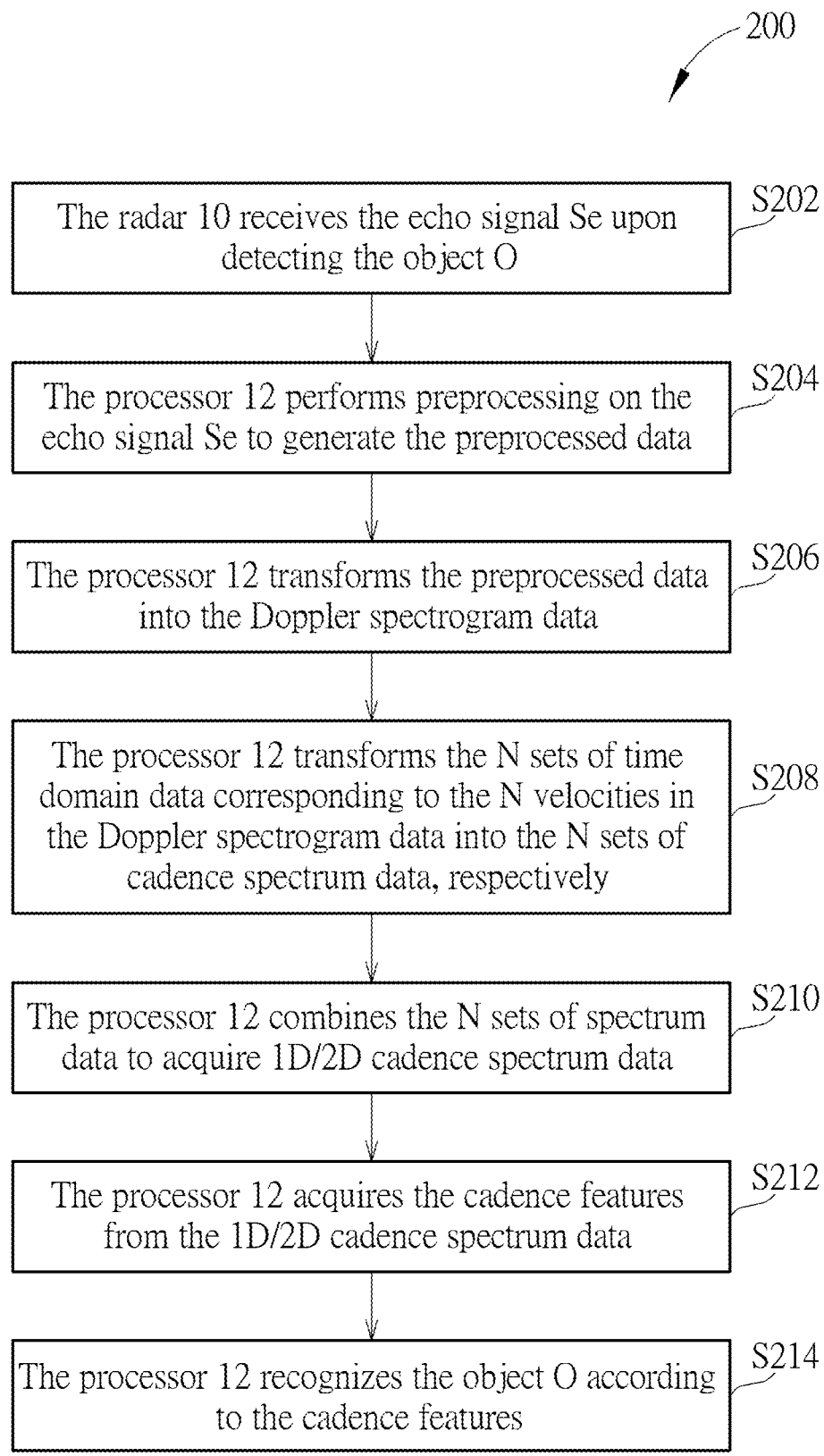
FIG. 2 is a flowchart of an object recognition method for used in an object recognition device in FIG. 1.

FIG. 2 is a flowchart of the object recognition method 200 for use in the object recognition device 1. The object recognition method 200 includes Steps S202 to S214, wherein Step S202 is used to detect the object O, and Steps S204 to S214 are used to recognize the object O. Any reasonable step change or adjustment is within the scope of the disclosure. Steps S202 to S214 are detailed using the object recognition device 1 as follows:

Step S202: The radar 10 receives the echo signal Se upon detecting the object O;
Step S204: The processor 12 performs preprocessing on the echo signal Se to generate the preprocessed data;
Step S206: The processor 12 transforms the preprocessed data into the Doppler spectrogram data;
Step S208: The processor 12 transforms the N sets of time domain data corresponding to the N velocities in the Doppler spectrogram data into the N sets of cadence spectrum data, respectively;
Step S210: The processor 12 combines the N sets of spectrum data to acquire 1D/2D cadence spectrum data; and
Step S212: The processor 12 acquires the cadence features from the 1D/2D cadence spectrum data;
Step S214: The processor 12 recognizes the object O according to the cadence features.

In step S202, the radar 10 continuously transmits the transmission signal St, receives the echo signal Se upon detection of the object O, and generates the Doppler signal Sd according to the echo signal Se. In step S204, the ADC 11 samples the Doppler signal Sd to generate a plurality of sampling data Ds, and then the processor 12 pre-processes the plurality of sampling data Ds to obtain a plurality of preprocessed data. The pre-processing may include a reduction in the samples and removal of the signal interference, and may be implemented using software, hardware, or a combination thereof. The processor 12 may reduce the number of sample data Ds, for example, by using a re-sampling function to reduce 44,100 sample data Ds per second by 80 times to generate about 550 re-sampled data per second. The re-sampled data may reduce computations of subsequent signal processing, preventing signal distortion and false detection of an object owing to the filter being unable to process a large quantity of data in the subsequent filtering process. Removal of signal interference may involve removal of mains interference and/or removal of short-time window signal processing interference. Next, a notch filter may reduce or remove AC interference from the re-sampled data to generate interference-reduced data. For example, since the frequency of an AC signal of the mains is 60 Hz, the notch filter may reduce or remove the harmonic interference at 60 Hz and its multiples, such as 120 Hz, 180 Hz, 240 Hz from the re-sampled data. It should be understood that the frequency spectrum of the sampling data Ds of the Doppler signal Sd may be generated using discrete frequency transform. A Hamming window may be applied to mask the signal prior to the discrete frequency transform, to reduce energy leakage, suppress the energy of the spectrum on both sides, and maximize the energy in the main lobe of the spectrum. The window length of the Hamming window may be equal to the length of the re-sampled signal. In some embodiments, the order of removing the AC interference and applying window functions is interchangeable.

Figure 3:
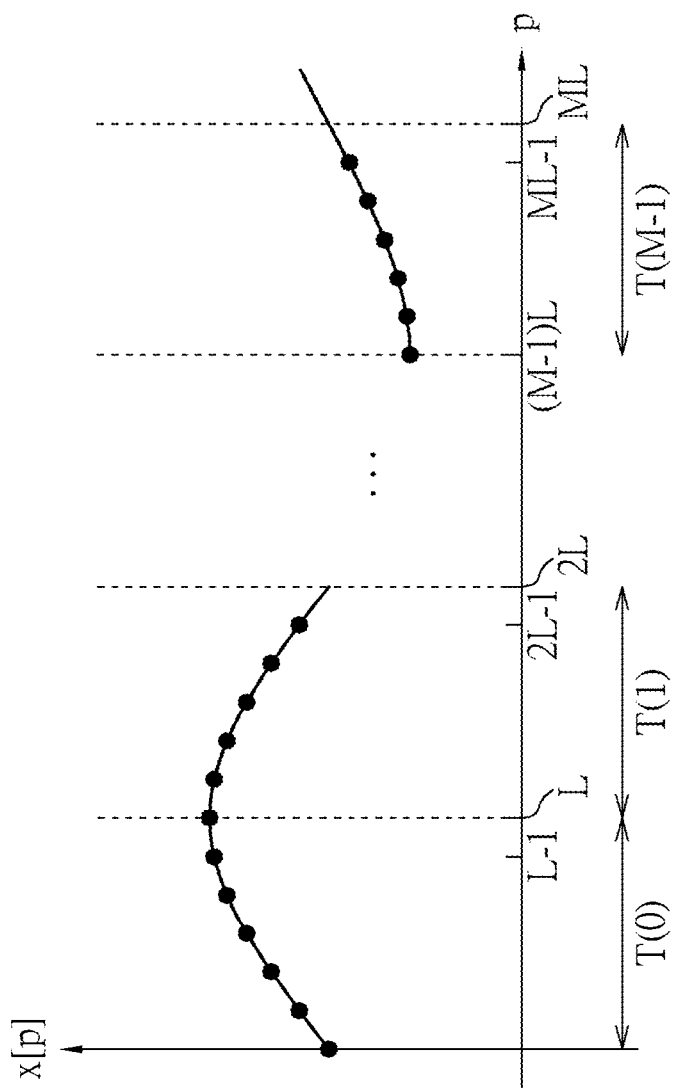
FIG. 3 shows a schematic diagram of preprocessed data.

In step S206, the processor 12 uses the short-time Fourier transform to generate the Doppler spectrogram data according to the plurality of preprocessed data. FIG. 3 is a schematic diagram showing ML pre-processed data x[0] to x[ML-1], where the horizontal axis represents the time index p, and the vertical axis represents magnitudes of the pre-processed data x[p] in voltage. M and L are positive integers, p is an integer and 0≤p<ML. When performing a short-time Fourier transform, the processor 12 may first divide the ML pre-processed data into M time intervals T(0) to T(M−1) processed data, the processed data in each time interval corresponding to L sampling points. The processor 12 then may use a fixed length L window function w(●) to process data at the sampling points in each time interval. The first time interval T(0) corresponds to the preprocessed data x[0] to x[L−1]. The second time interval T(1) corresponds to the preprocessed data x[L] to x[2L−1], and so on. The m-th time interval T(m−1) corresponds to the preprocessed data x[(m−1)L] to x[mL−1]. m is an integer and 1≤m≤M. The processor 12 may perform the Fourier transform on the L pre-processed data in each time interval to generate the energy distribution of the L/2 frequencies. In some embodiments, two adjacent time intervals may partially overlap. For example, the preprocessed data within 3 seconds is divided into time intervals of 0.1 seconds to generate 30 time intervals. When two adjacent time intervals are 95% overlapped, 3 seconds could contain more than five hundreds intervals. Each time interval corresponds to 55 sampling points of the preprocessed data. The processor 12 may perform the Fourier transform on the pre-processed data with 55 sampling points in each time interval to generate the energy distribution of frequencies in the 40 time intervals. In some embodiments, in order to facilitate hardware computations, the processor 12 may add data points with a value of 0 in each time interval to obtain the energy levels of 2 to power of N in each time interval, e.g. if N=8, then 256 energy levels of frequencies, where the 256 energy levels of frequencies include 128 energy levels of positive frequencies and 128 energy levels of negative frequencies. When the transmitted signal St has a single frequency and phase, the energy distribution of positive or negative frequencies are the same. When two types of transmission signals St identical in frequency but out-of-phase by 90 degrees are transmitted, the complex permutations (A+Bi, A-Bi) of the echo signals Se can be used to indicate the object moving directions. The short-time Fourier transform may be a discrete short-time Fourier transform, expressed by Equation 2:

$$X[k, m, h] = \sum_{q=0}^{L-1} x[(m-1)L + q]w[q]e^{\frac{-i2\pi hk}{L}}$$ Equation 2

Where L is the length of the window;
w[q] is window function data, q is window function data index, q is an integer and 0≤q<L;
x[(m−1)L+q] is the preprocessed data of the m-th time interval T(m−1), and m is the time interval index; and
X[k,m,h] is the energy of the m-th set of frequencies, k is the time index, k is an integer and 0≤k<L, h is a frequency index, h is an integer and 0≤h<L/2.

Each frequency index h corresponds to a frequency fd, and the processor 12 may use Equation 1 to convert the frequency fd into a corresponding velocity v. In some embodiments, when the radar 10 emits the two types of transmitted signals St with identical in frequency but out-of-phase by 90 degrees, the frequency fd may correspond to either a positive or a negative velocity v depending on the direction. Then the processor 12 may generate the energy s[m,h] of the corresponding velocity v according to the magnitude of the energy X[k,m,h] of the m-th set of frequencies, the magnitude of the energy X[k,m,h] being expressed by Equation 3:

$$s[m, h] = |X[k, m, h]|$$ Equation 3

The processor 12 may generate M sets of Doppler spectrum data according to the energies s[m,h] of all the velocities v. In order to make the matrix indexes more intuitively related to the actual graphical representation with positive and negative velocities, the m-th set of Doppler spectrum data is denoted as having the energy s[m,−L/2] to s[m,L/2] of L velocities v. The M sets of Doppler spectrum data may form a Doppler spectrogram matrix Dm as expressed by Equation 4:

$$Dm = \begin{bmatrix} s\left[0, \frac{L}{2}\right] & \cdots & s\left[M-1, \frac{L}{2}\right] \\ \vdots & \ddots & \vdots \\ s[0, 1] & \cdots & s[M-1, 1] \\ s[0, -1] & \cdots & s[M-1, -1] \\ \vdots & \ddots & \vdots \\ s\left[0, -\frac{L}{2}\right] & \cdots & s\left[M-1, -\frac{L}{2}\right] \end{bmatrix}$$ Equation 4

Figure 4:
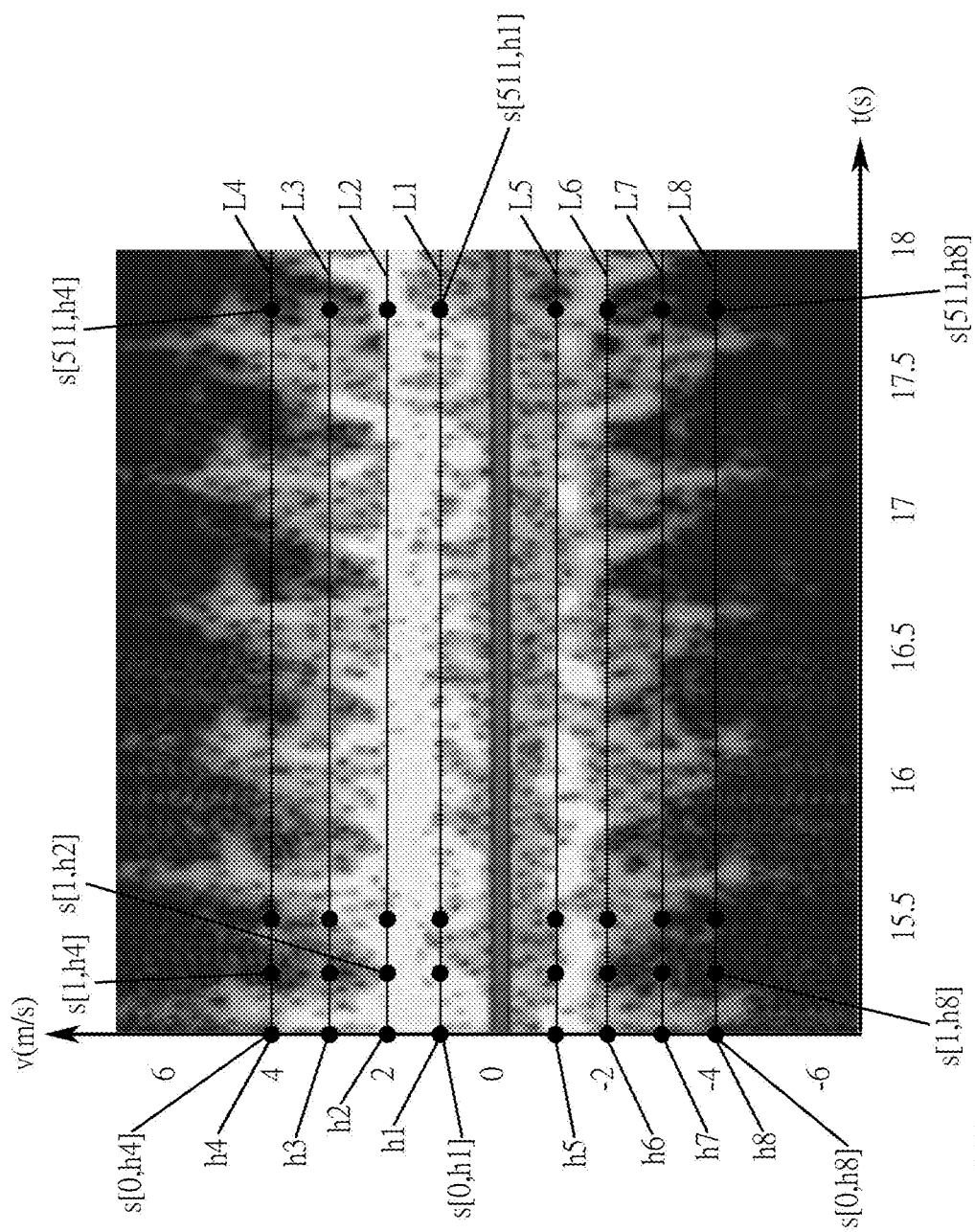
FIG. 4 shows a Doppler spectrogram according to an embodiment of the invention.

When m is from 0 to M−1 and h is from 1 to L/2, the matrix element s[m, h] of the Doppler spectrogram matrix Dm is the energy corresponding to a positive velocity v. When m is from 0 to M−1 and h is from −1 and −L/2, the matrix element s[m,h] of the Doppler spectrogram matrix Dm is the energy corresponding to a negative velocity v. The processor 12 may generate a Doppler spectrogram matrix Dm according to the Doppler spectrogram matrix Dm, as shown in FIG. 4, where the horizontal axis represents time, and the vertical axis represents velocity v. The gray scale in FIG. 4 represents the energy of a velocity, and a higher gray scale value indicates a higher energy s[m,h]. The vertical axis at a particular time t represents the energy distribution of the velocities. For example, when the time t is 15 s, the corresponding range of the energy distribution of the first set of velocities is from 4 m/s to −2 m/s. The set of velocities at each time t may include 128 positive velocities and 128 negative velocities, corresponding to back swings and forth swings of the limbs and torso when a person or an animal moves.

Figure 5:
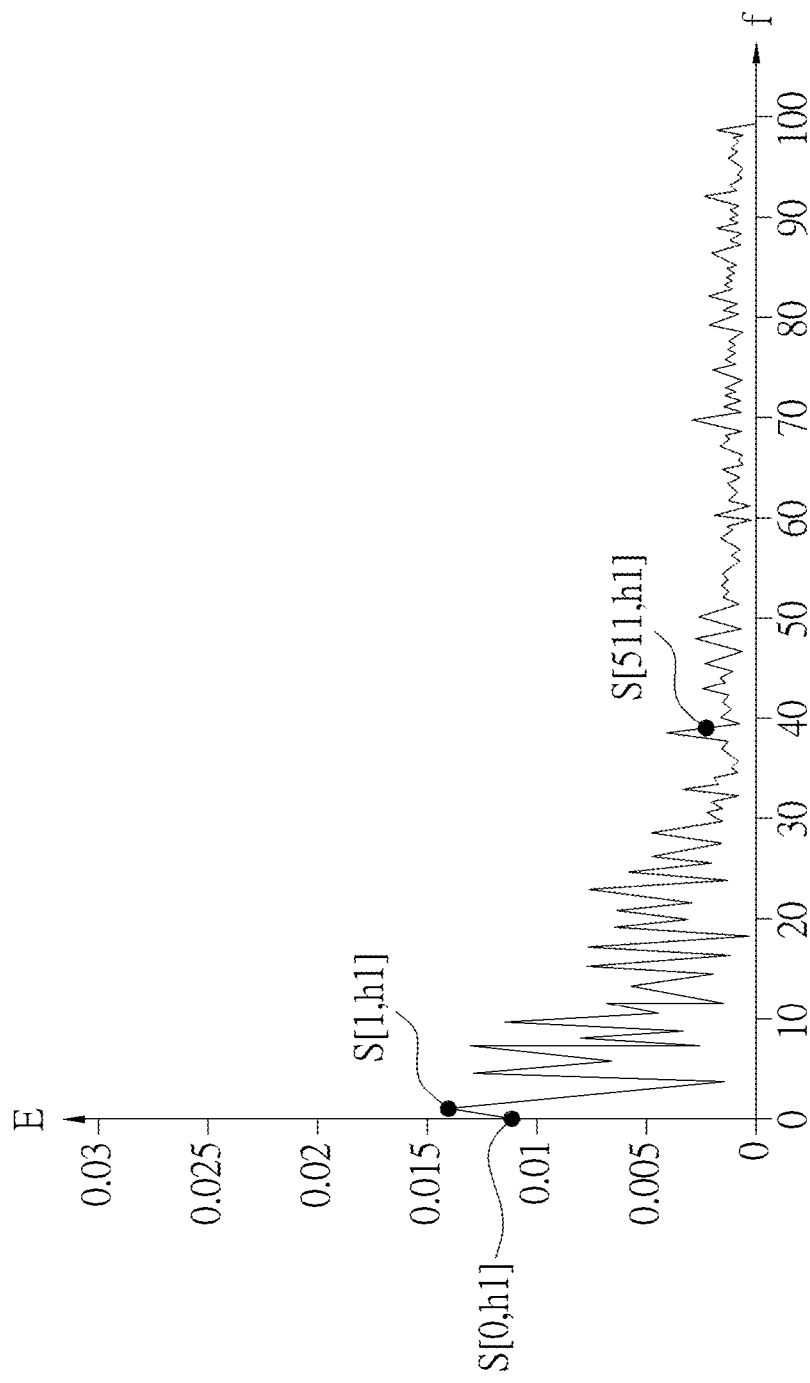
FIG. 5 shows a cadence spectrum according to an embodiment of the invention.

In Step S208, the processor 12 transforms the N sets of time domain data at L velocities in the Doppler spectrogram data into the N sets of cadence spectrum data. For example, 4 sampling lines L1, L2, L3, L4 (N=4) are drawn in the Doppler spectrogram, corresponding to 4 velocities of 1 m/s, 2 m/s, 3 m/s, 4 m/s, respectively. The time domain data s[m,hn] represents the energy on the sampling line Ln in the m-th time window, n being a positive integer and n<N. The processor 12 obtains the first set of time domain data {s[0,h1], s[1,h1], s[511,h1]} corresponding to the magnitude change in velocity of 1 m/s during 15-18 seconds from the sampling line L1. The second set of time domain data {s[0,h2], s[1,h2], s[511,h2]} corresponding to the velocity of 2 m/s are obtained from the sampling line L2. The third set of time domain data {s[0,h3], s[1,h3], s[511,h3]} corresponding to the velocity of 3 m/s are obtained from the sampling line L3. The fourth set of time domain data {s[0,h4], s[1,h4], s[511,h4]} corresponding to the velocity of 4 m/s are obtained from the sampling line L4. The processor 12 uses Equation 5 to perform a discrete Fourier transform on the n-th set of time domain data {s[0,hn], s[1,hn], s[511,hn]} to generate the n-th set of cadence spectrum data {S[0,hn], S[1,hn], S[M−1,hn]}.

$$S[f, hn] = \sum_{m=0}^{M-1} s[m, hn]e^{\frac{-i2\pi fm}{M}}$$ Equation 5 wherein S[f,hn] is the energy of the n-th set of cadence spectrum data at the (f+1)-th frequency, f is a non-negative integer less than M, and M is the number of samples. After performing a discrete Fourier transform, half of the time domain data s[f,hn], either from S[0,hn] to S[M/2-1,hn] or from S[M/2,hn] to S(M−1,hn), are duplication of the other half. Therefore, half of the time domain data can be discarded. For example, the processor 12 may perform the discrete Fourier transform on the first set of time domain data {s[0,h1], s[1,h1], s[511,h1]} to obtain the first set of cadence spectrum data {S[0,h1], S[1,h1], S[255,h1]}, perform the discrete Fourier transform on the second set of time domain data {s[0,h2], s[1,h2], s[511,h2]} to obtain the second set of cadence spectrum data {S[0,h2], S[1,h2], S[255,h2]}, perform the discrete Fourier transform on the third set of time-domain data {s[0,h3], s[1,h3], s[511,h3]} to obtain the third set of cadence spectrum data {S[0,h3], S[1,h3], S[255,h3]}, and perform the discrete Fourier transform on the fourth set of time domain data {s[0,h4], s[1,h4], s[511,h4]} to obtain the fourth set of cadence spectrum data{S[0,h4], S[1,h4], S[255,h4]}. The first set of cadence spectrum data {S[0,h1], S[1,h1], S[255,h1]} may generate a cadence spectrum corresponding to the change speed of velocity of 1 m/s according to the frequencies, as shown in FIG. 5, where the horizontal axis represents frequency f, and the vertical axis represents energy E. The spectrum for the velocity of 1 m/s represents the energy distribution at different frequencies, and may represent the number of swings per second of a specific portion of the object O. FIG. 5 shows that the main frequency distribution at a velocity of 1 m/s is less than 10 Hz. The cadence spectrum data at other velocities of 2 m/s, 3 m/s, 4 m/s may also be drawn according to the frequencies. In some embodiments, the frequency range of the spectra may be set at 0-20 Hz by taking the normal swing frequency of a human or animal walking into consideration. In some embodiments, the processor 12 may also generate cadence spectrum data of the negative velocities according to the time domain data corresponding to the negative velocities in the Doppler spectrogram data, e.g., according to the 4 sets of time domain data on the sampling lines L5 to L8 {s[0,h5], s[1,h5], s[511,h5]} to {s[0,h8], s[1,h8], s[511,h8]} to generate 4 sets of cadence spectrum data of the negative velocities {S[0,h5], S[1,h5], S[255,h5]} to {S[0,h8], S[1,h8], S[255,h8]}.

Figure 6:
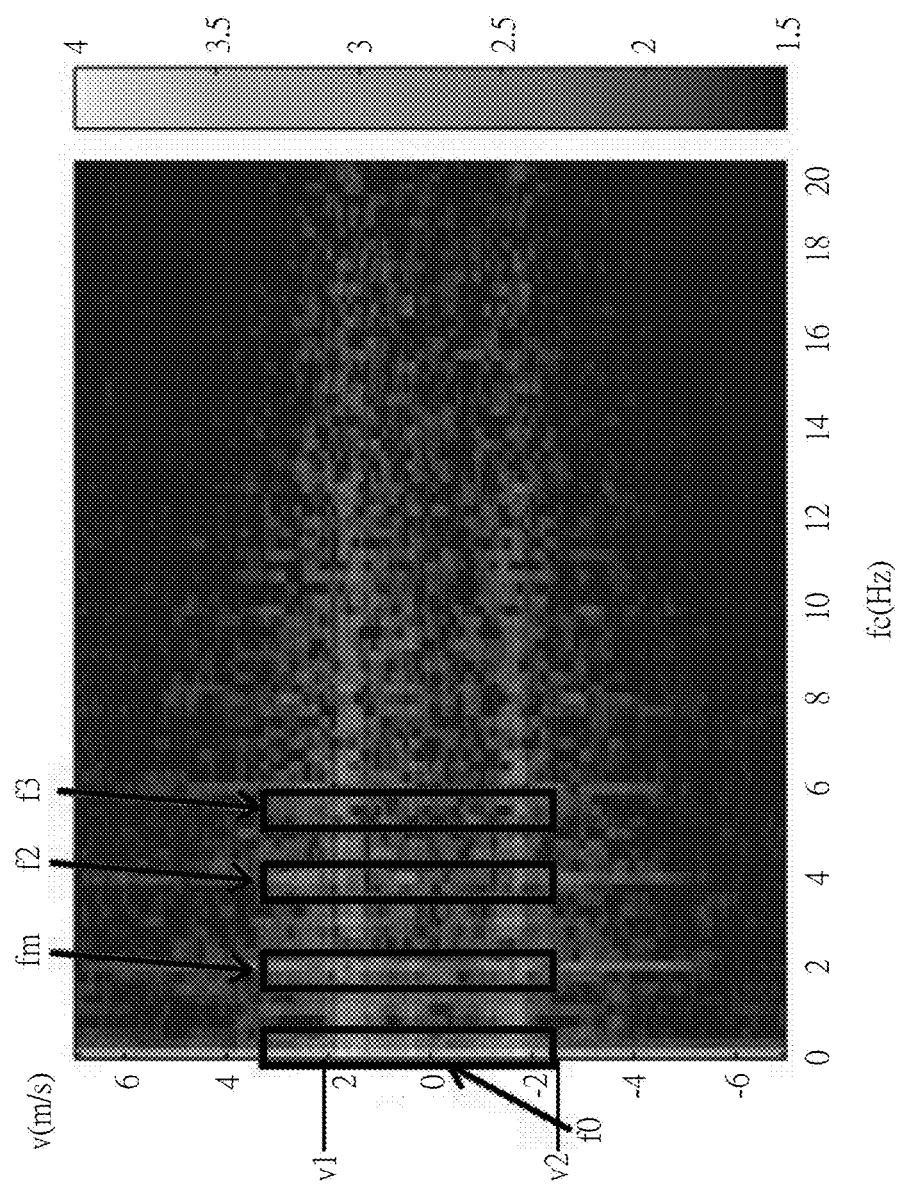
FIG. 6 shows a two-dimensional cadence spectrum according to an embodiment of the invention.

In Step S210, the processor 12 combines the N sets of cadence spectrum data to acquire one-dimensional/two-dimensional (1D/2D) cadence spectrum data. In some embodiments, the processor 12 may combine N sets of cadence spectrum data along the vertical direction to obtain 1D/2D cadence spectrum data. For example, the processor 12 may combine along the vertical direction the corresponding frequency domain energies of the first set of cadence spectrum data {S[0,h1], S[1,h1], S[255,h1]} to the eighth set of cadence spectrum data {S[0, h8], S[1,h8], S[255,h8]} to generate a matrix {C[1], . . . , C[8]}. C[1] to C[8] are the row vectors of the matrix. Each raw vector C[n] is a 1D cadence spectrum data, C[1]=g(1) x (S[0,h1]; S[1,h1]; . . . ; S [255,h1]), C[8]=g(8) x (S[0,h8]; S[1,h8]; . . . ; S[255,h8]), g being a normalization coefficient, assigning different weights according to different corresponding velocities. Each cadence spectrum data C[n] represents the energy distribution of normalized velocities at the corresponding frequencies. The matrix {C[0], . . . , C[255]} may form a corresponding 2D cadence spectrum. FIG. 6 is a 2D cadence spectrum, where the horizontal axis represents the cadence frequency fc. The vertical axis represents velocity. The grayscale value in FIG. 6 represents the energy corresponding to a velocity. A higher grayscale value represents a higher energy. The 2D cadence spectrum shows the energy distribution corresponding to the velocities at different cadence frequencies fc. For example, in FIG. 6, it can be observed that the energy distribution corresponding to velocities of the object O at the cadence frequencies fc of 0 Hz, 2 Hz, 4 Hz, and 6 Hz. 0 Hz may be the swing frequency of the torso, 2 Hz may be the swing frequency of the limbs, and 4 Hz and 6 Hz may be the harmonic frequencies of 2 Hz. In some embodiments, the processor 12 may remove the DC component of the 2D cadence spectrum data, that is, the 2D cadence spectrum data C[0] approximately at 0 Hz.

Figure 7:
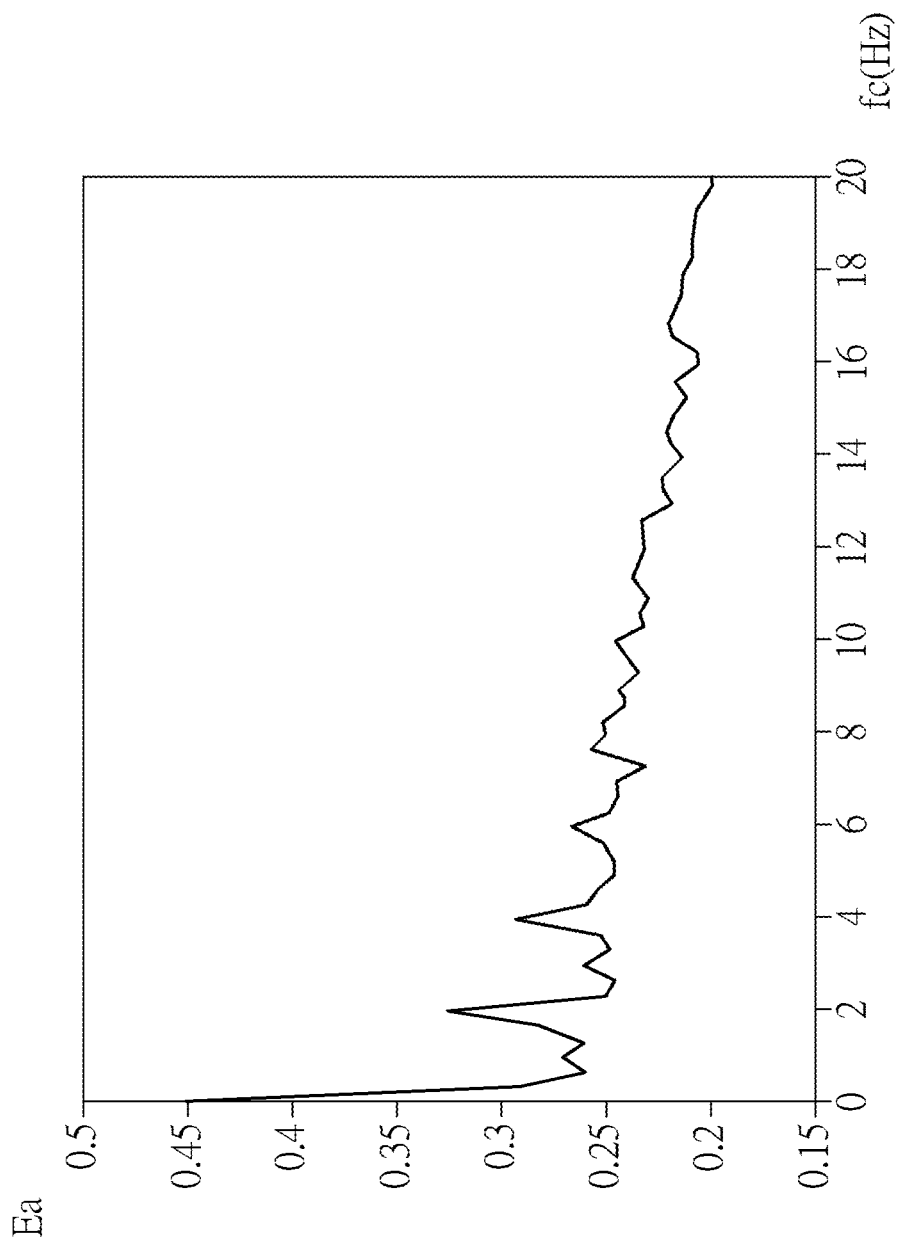
FIG. 7 shows a one-dimensional cadence spectrum including cadence spectrum data of the positive velocities according to an embodiment of the invention.

In other embodiments, the processor 12 may add N sets of spectrum data along the vertical direction together to obtain the 1D cadence spectrum data. The N sets of spectrum data may correspond to positive velocities and/or negative velocities. For example, when using the N sets of spectrum data corresponding to positive velocities, the processor 12 may add along the vertical direction and in an element-wise manner the first set of spectrum data {S[0,h1], S[1,h1], S[255,h1]} to the fourth set of spectrum data {S[0,h4], S[1,h4], S[255,h4]} to generate a row vector Cp. It represents an accumulated energy of normalized velocities at the corresponding frequency, and can cover more than h1–h4, for example, the whole positive velocities 1~L. FIG. 7 is a combined 1D cadence spectrum, where the horizontal axis represents the cadence frequency fc, and the vertical axis represents the normalized accumulated energy Ea of the vector Cp. The combined 1D cadence spectrum represents a distribution of the normalized accumulated energies over a range of the cadence frequencies fc. The distribution of the normalized accumulated energies Ea corresponding to the cadence frequencies fc of the object O at 0 Hz, 2 Hz, 4 Hz, and 6 Hz may be observed in FIG. 7. The peak of the normalized accumulated energy Ea at 0 Hz may indicate the movement of the torso, the peak at 2 Hz may indicate the movement of the limbs, and the peaks at 4 Hz and 6 Hz may be the harmonics of the peak at 2 Hz. In some embodiments, the processor 12 may remove the DC component of the 1D cadence spectrum data, that is, the 1D cadence spectrum data C[0] approximately at 0 Hz.

Then the processor 12 obtains the cadence features from the 1D/2D cadence spectrum data (Step S212) and recognizes the object O according to the cadence features (Step S214). The cadence features may be: 1. a stride length of the 2D cadence spectrum and a ratio of the secondary energy to the primary energy; 2. the 1D cadence spectrum data; 3. the minimum of autocorrelations and the cadence spectrum data in the combined cadence spectrum; or 4. the velocity-normalized cadence spectrum data.

The processor 12 may recognize the object O by taking the movement range and the ratio of the secondary energy to the primary energy in the 2D cadence spectrum as the cadence features. The object O includes a primary portion and a secondary portion. For example, the primary portion may be a torso of a person, and the secondary portion may be a limb of the person. The processor 12 may identify the primary velocity of the primary portion from the 2D cadence spectrum data and its fundamental frequency, calculate the movement range based on the division of fundamental frequency and the primary velocity, then identify the secondary energy of the secondary portion (ex. f2, f3 in FIG. 6) and the primary energy of the primary portion (ex. fm in FIG. 6) from the 2D cadence spectrum data, calculate the ratio of the secondary energy to the primary energy, and recognize the object O according to the movement range and the ratio. The primary velocity of the primary portion may be the moving velocity of the torso. The movement range may be the step length S. The primary energy may be the part of the echo signal Se corresponding to the torso. The secondary energy may be the parts of the echo signal Se corresponding to the limbs, and the ratio of the secondary energy to the primary energy may be a ratio R of the reflected energy of the limbs to the reflected energy of the torso. In some embodiments, the processor 12 may employ the stride length S and the ratio R of the energy of the limbs to the energy of the torso as the cadence features for identifying the object O. The processor 12 may use Equation 6 to compute the stride length S according to the torso velocity and the fundamental frequency, and use Equation 7 to compute the ratio R of limb energy to torso energy to generate cadence features.

$$S = \frac{Vt}{fm} \qquad \text{Equation 6}$$

Wherein S is the stride length;
Vt is the torso velocity; and
fm is the fundamental frequency.

$$R = \frac{\sum_{n=1}^{D} Sn}{S0} \qquad \text{Equation 7}$$

Wherein R is the ratio of a limb to a torso;
n is the index of a secondary energy;
D is the maximum index of the secondary energies;
S0 is the primary energy; and
Sn is the secondary energy.

Referring to FIG. 6, the corresponding maximum velocity v1 or v2 in the cadence frequency range over 0 Hz to 20 Hz may be the torso velocity Vt. The cadence frequency fm corresponding to the velocities from 7 m/s to −5 m/s may be the fundamental frequency of a limb swing. For example, the torso velocity Vt is about 2 m/s, the fundamental frequency fm is about 2 Hz, then the stride length S is about 1 meter (Vt/fm=2/2=1). In some embodiments, the processor 12 may add the energies of the same velocity v along the horizontal direction to generate the total energy, and determine the corresponding velocity of the maximum total energy among all the total energies as the torso velocity Vt, e.g., 2 m/s. The processor 12 may add the energies of the same frequency f along the vertical direction to generate the total energy, determine the peak frequency according to all the total energies, and then determine the maximum peak frequency of the non-DC frequency as the fundamental frequency fm, e.g., 2 Hz.

In addition, the energy distribution of the peak frequencies f0, fm, f2, and f3 on the horizontal axis may correspond to the energy distribution across velocities of 7 m/s to −7 m/s, 7 m/s to −5 m/s, 7 m/s to −5 m/s and 6 m/s to −4 m/s. For example, the primary energy component S0 may be the total energy corresponding to the velocity 7 m/s to −7 m/s at the peak frequency f0, the maximum index D may be 3, and the secondary energy may include the first to the third secondary energy components S1 to S3, the energy of the first secondary energy component S1 may be the total energy corresponding to the velocities of 7 m/s to −5 m/s at the peak frequency fm, and the second secondary energy component S2 may be the total energy corresponding to the velocities of 7 m/s to −5 m/s at the peak frequency f2, and the third secondary energy component S3 may be the total energy corresponding to the velocities of 6 m/s to −4 m at the peak frequency The ratio R of the limbs to the torso may be (S1+S2+S3)/S0. In some embodiments, the processor 12 may sum the energy at each frequency f along the vertical direction to generate the total energy at that frequency. After the processor 12 obtains the total energies of all frequencies, the peak frequency may be determined. The processor 12 may define a peak frequency approximately equal to 0 Hz as the peak frequency f0. The processor 12 may sequentially define the peaks after 0 Hz as fm, f2, and f3. The processor 12 may further define the total energy corresponding to the frequencies f0, fm, f2, and f3 as the energy component of the primary portion S0 and the energy components of the secondary portion S1, S2, S3.

The processor 12 may input the stride length S and the ratio R of the limbs to the torso into the classifier 120, so as to classify the object O according to the stride length S and the ratio R of the limbs to the torso. Different objects O may have different stride lengths S. For example, the stride length S of a walking person may be between 30 and 40 cm, and the stride length S of a small walking dog may be less than 10 cm. Different objects O may have different ratios R of limbs to torso. For example, the ratio R of limbs to torso of a human may be about 0.6, and the ratio R of limbs to torso of a dog may be greater than 0.7.

Figure 8:
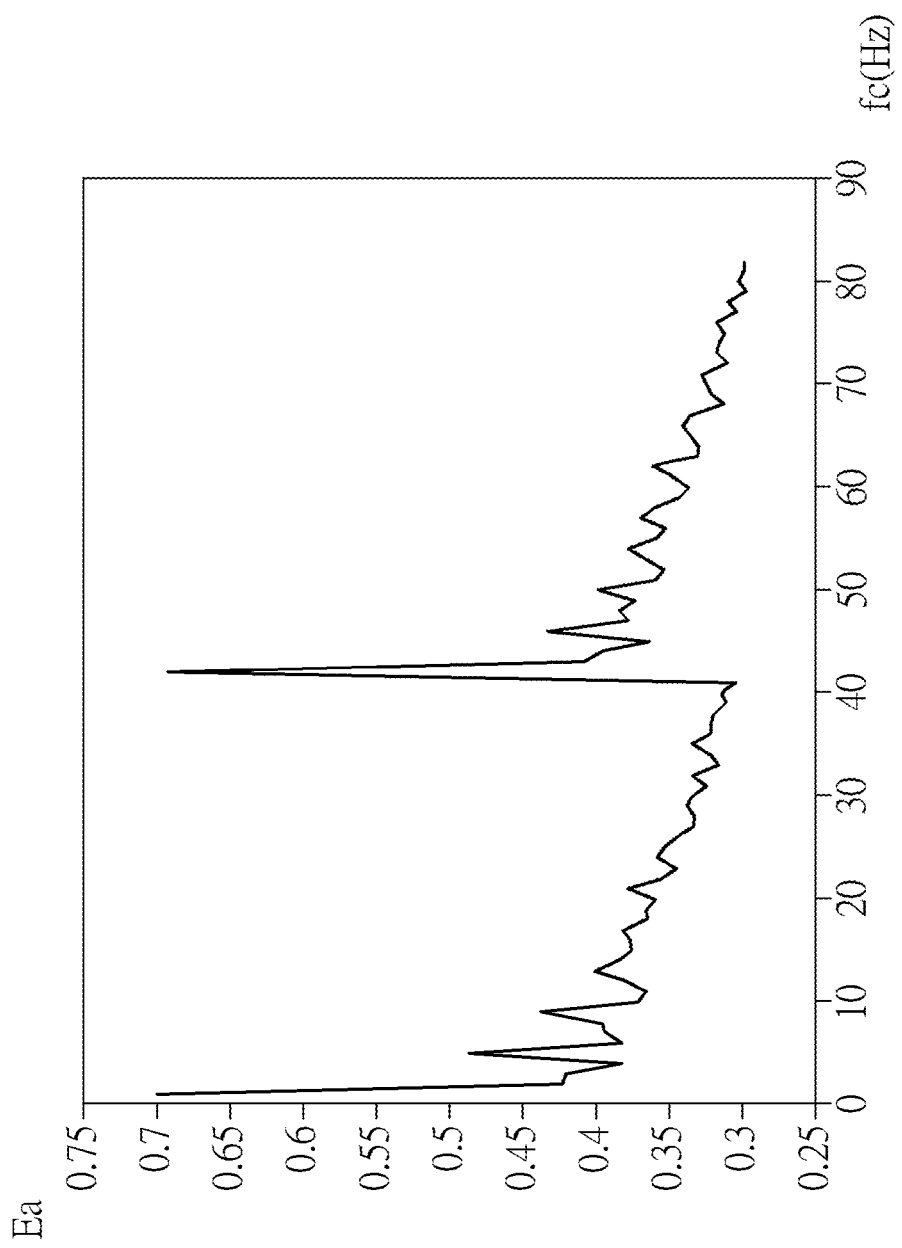
FIG. 8 shows a one-dimensional concatenated cadence spectrum including cadence spectrum data of the positive velocities and the negative velocities according to an embodiment of the invention.

The processor 12 may use the 1D cadence spectrum data as the cadence feature to identify the object O. Referring to FIG. 7, the processor 12 may input the 1D cadence spectrum data Cp to the classifier 120 to classify the object O accordingly. In some embodiments, the processor 12 may convert the energy distribution of the positive velocities and the energy distribution of the negative velocities of the Doppler spectrogram into 1D cadence spectrum data of the positive velocities and 1D cadence spectrum data of the negative velocities. For example, the 4 sets of time domain data on the sampling lines L1 to L4 in FIG. 4 may be converted into the 1D cadence spectrum data of the positive velocities C[1] to C[4], and the 4 sets of time domain data on sampling lines L5 to L8 may be converted into 1D cadence spectrum data of the negative velocities C[5] To C[5]. The 1D cadence spectrum data of the positive velocities Cpand the 1D cadence spectrum data of the negative velocities Cn may be concatenated to form another 1D cadence spectrum [Cp Cn] as in FIG. 8, where the horizontal axis represents the cadence frequency index fc, and the vertical axis represents the normalized accumulated energy Ea of the 1D cadence spectrum data C. The processor 12 may input the concatenated 1D cadence spectrum data {Cp,Cn} into the classifier 120 to classify the object O accordingly. Different objects O may correspond to different peak cadence frequencies. For example, the peak cadence frequency of a human may be at about 2 Hz, and its high-order harmonic frequencies may be at about 4 Hz, 6 Hz, and the peak cadence frequency of a dog may not be fixed. In some embodiments, the processor 12 may compare the total energy of the positive velocity (1D cadence spectrum data Cp) and the total energy of the negative velocity (1D cadence spectrum data Cn). The 1D cadence spectrum data of the larger one is placed before the 1D cadence spectrum data of the other to serve as the cadence features to be input into the classifier 120. The larger one of the total energy of the 1D cadence spectrum data of the positive velocities and the total energy of the 1D cadence spectrum data of the negative velocities may be expressed by:

$$\max\{Ea(Cp), Ea(Cn)\}$$

For example, when the total energy of the 1D cadence spectrum data of the negative velocities Cn is greater than the total energy of the 1D cadence spectrum data of the positive velocities Cp, the cadence features are:

{Cn, Cp}

When the total energy of the 1D cadence spectrum data of the positive velocities Cp is greater than the total energy of the 1D cadence spectrum data of the negative velocities Cn, the cadence features are:

{Cp, Cn}

The processor 12 may employ the combined cadence spectrum data and the minimum autocorrelation of the combined cadence spectrum as the cadence features to identify the object O. The definition of the combined cadence spectrum will be provided in the following paragraphs. The processor 12 may generate combined Doppler spectrogram data according to M sets of positive velocity energies and M sets of negative velocity energies corresponding to M points in time in the Doppler spectrogram, and transform the N sets of time domain data corresponding to the N velocities in the combined Doppler spectrogram data into the N sets of spectrum data, respectively. The combined Doppler spectrogram data may include M sets of combined Doppler spectrum data. In some embodiments, the processor 12 may group the energy distribution data of the Doppler spectrogram into Doppler spectrogram data of the positive velocities and Doppler spectrogram data of the negative velocities. The Doppler spectrogram data of the positive velocities and the Doppler spectrogram data of the negative velocities may form a Doppler spectrogram matrix Dp of positive velocities and a Doppler spectrogram matrix Dn of negative velocities, respectively, expressed by Equation 8 and Equation 9:

$$Dp = \begin{bmatrix} s\left[0, \frac{L}{2}\right] & \cdots & s\left[M-1, \frac{L}{2}\right] \\ \vdots & \ddots & \vdots \\ s[0, 1] & \cdots & s[M-1, 1] \end{bmatrix} \quad \text{Equation 8}$$

$$Dn = \begin{bmatrix} s[0, -1] & \cdots & s[M-1, -1] \\ \vdots & \ddots & \vdots \\ s\left[0, -\frac{L}{2}\right] & \cdots & s\left[M-1, -\frac{L}{2}\right] \end{bmatrix} \quad \text{Equation 9}$$

The above indexes settings follow the same reason of Equation 4 that to be more intuitively related to the actual graphical representation with positive and negative velocities. Each matrix element in the Doppler spectrogram matrix Dp of positive velocities represents the energy of a positive velocity. The processor 12 may add the M sets of positive velocity energies to generate a total positive velocity energy Esp, expressed by Equation 10:

$$Esp = \sum_{l=1}^{\frac{L}{2}} \sum_{m=0}^{M-1} s(m, l) \quad \text{Equation 10}$$

Each matrix element in the Doppler spectrogram matrix Dn of negative velocities represents the energy of a negative velocity, and the processor 12 may add the M sets of negative velocity energies to generate a total energy of negative velocities Esn, expressed by Equation 11;

$$Esn = \sum_{l=-1}^{-\frac{L}{2}} \sum_{m=0}^{M-1} s(m, l) \quad \text{Equation 11}$$

Then the processor 12 may determine which of the total energy of positive velocities Esp and the total energy of negative velocities Esn is larger, divide an element in the Doppler spectrogram matrix corresponding to the larger one by an element in the Doppler spectrogram matrix corresponding to the smaller one at the same position, so as to generate a combined Doppler spectrogram matrix. For example, when the total energy of positive velocities is greater than the total energy of negative velocities, the Doppler spectrogram matrix Dc1 may be expressed as Equation 12:

$$Dc1 = \quad \text{Equation 12}$$

$$\begin{bmatrix} s\left[0, \frac{L}{2}\right]/s\left[0, -\frac{L}{2}\right] & \cdots & s\left[M-1, \frac{L}{2}\right]/s\left[M-1, -\frac{L}{2}\right] \\ \vdots & \ddots & \vdots \\ s[0, 1]/s[0, -1] & \cdots & s[M-1, 1]/s[M-1, -1] \end{bmatrix}$$

When the total energy of negative velocities is greater than the total energy of positive velocities, the Doppler spectrogram matrix Dc2 may be expressed as Equation 13:

$$Dc2 = \quad \text{Equation 13}$$

$$\begin{bmatrix} s\left[0, -\frac{L}{2}\right]/s\left[0, \frac{L}{2}\right] & \cdots & s\left[M-1, -\frac{L}{2}\right]/s\left[M-1, \frac{L}{2}\right] \\ \vdots & \ddots & \vdots \\ s[0, -1]/s[0, 1] & \cdots & s[M-1, -1]/s[M-1, 1] \end{bmatrix}$$

Figure 9:
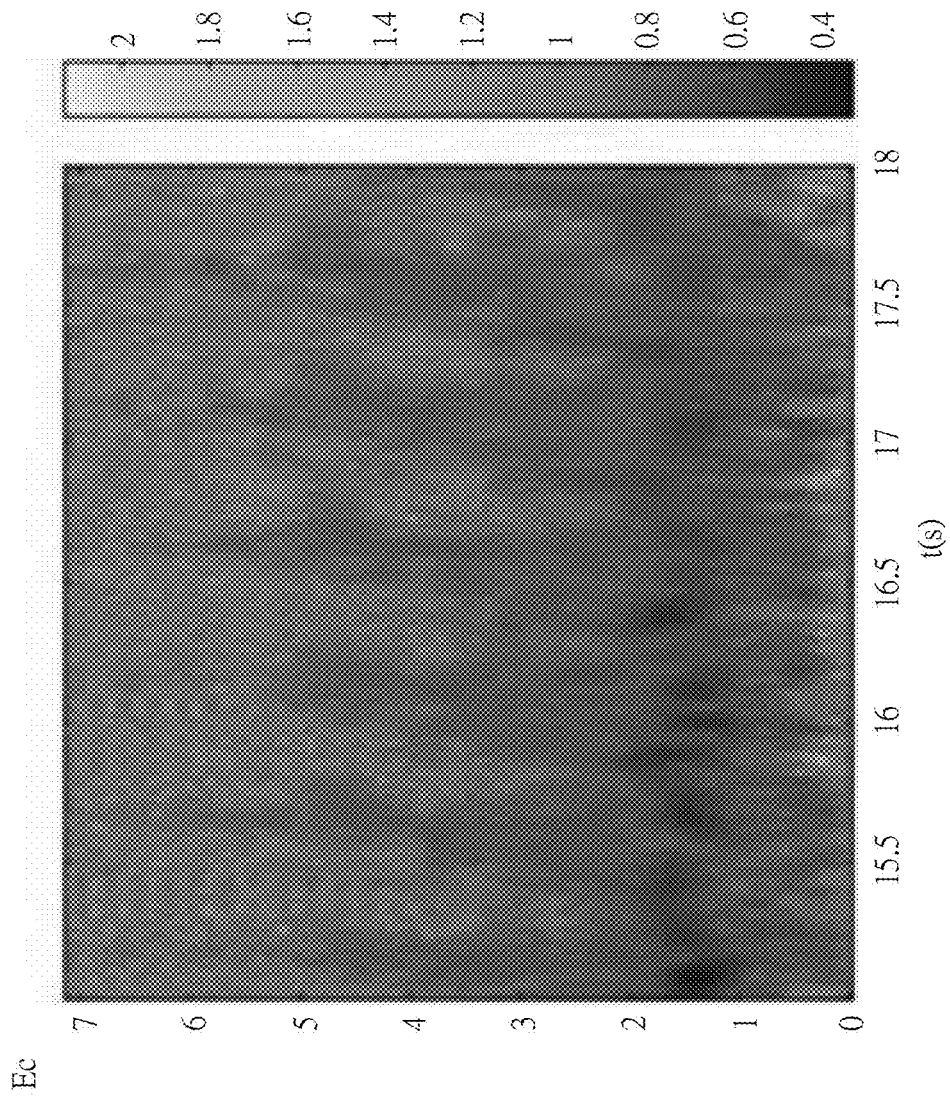
FIG. 9 shows a combined Doppler spectrogram according to an embodiment of the invention.

In other embodiments, the processor 12 may employ the Doppler spectrogram matrix corresponding to the larger of the total energy of positive velocities Esp and the total energy of negative velocities Esn as a combined Doppler spectrogram matrix. The combined Doppler spectrogram data may be plotted into the combined Doppler spectrogram as shown in FIG. 9, in which the horizontal axis represents time, and the vertical axis represents the combined energy Ec. The processor 12 may convert the N sets of time domain data corresponding to the N velocities in the combined Doppler spectrogram data into the N sets of spectrum data according to Step S208, respectively, and add the corresponding energies of the N sets of spectrum data according to Step S210 to obtain the N cadence spectrum data C[1] to C[N]. For example, the processor 12 may convert the 4 sets of time domain data corresponding to 4 velocities in the combined Doppler spectrogram data into 4 sets of spectrum data, respectively, and add the energies of the 4 sets of spectrum data in the frequency domain to obtain the combined cadence spectrum data C[1] to C[4].

Figure 10:
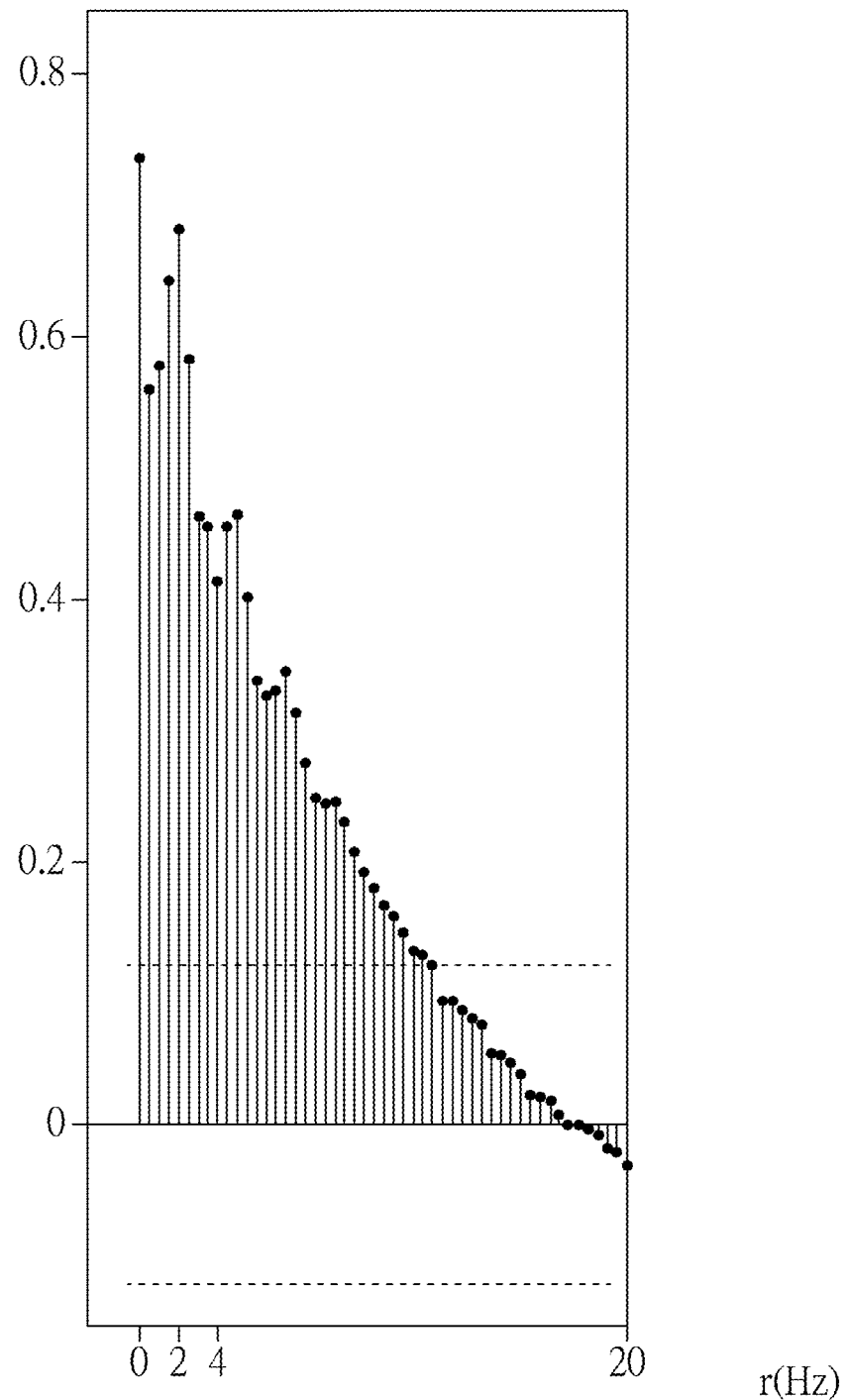
FIG. 10 shows the autocorrelations generated according to the combined cadence spectrum data.
Figure 11:
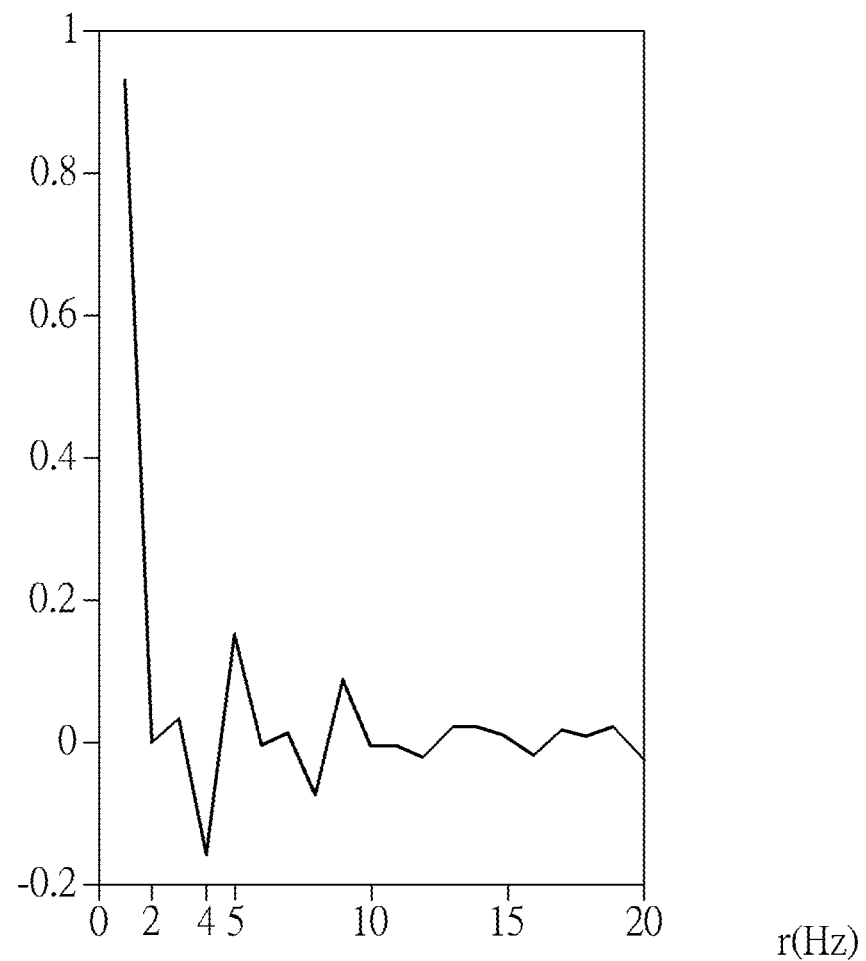
FIG. 11 shows the level of autocorrelation of combined cadence spectrum data according to an embodiment of the invention.

The processor 12 may use Equation 14 to apply an autocorrelation function to the 1D cadence spectrum data Cp to generate a plurality of autocorrelations AC(r), and then compute the differences between two consecutive autocorrelations among the plurality of autocorrelations to generate a plurality of differences. The processor 12 may use the smallest difference among the plurality of differences as the minimum autocorrelation difference.

$$AC(r) = \sum_{m=0}^{M-1} Cp(m)Cp(m-r) \quad \text{Equation 14}$$

r is the amount of a shift of the autocorrelation. For example, if FIG. 7 is a 1D combined cadence spectrum, the processor 12 may use the 1D combined cadence spectrum data C in FIG. 7 to generate the plurality of autocorrelations AC(r) according to Equation 14. FIG. 10 shows the autocorrelations AC(0) to AC(49) generated according to the 1D combined cadence spectrum data Cp, where the horizontal axis represents the amount of shifts r, the vertical axis represents the autocorrelation AC(r), and an interval between the adjacent shift (r+1) and the shift r may be 0.4 Hz. As shown in FIG. 10, the autocorrelations AC(r) show peaks at 0 Hz, 2 Hz, and 4 Hz, corresponding to the peaks of the 1D combined cadence spectrum data C at the cadence frequency fc at 0 Hz, 2 Hz, and 4 Hz in FIG. 7, that is, the autocorrelation AC(r) reaches a peak when the cadence frequency fc is a harmonic frequency. The processor 12 then may calculate the 49 differences between the two adjacent points AC(r+1) and AC(r) in the autocorrelations AC(0) to AC(49), and employ the smallest difference among the 50 differences as the minimum autocorrelation difference. FIG. 11 shows the difference of the autocorrelations of the 1D combined cadence spectrum data Cp, where the horizontal axis represents the shift r, and the vertical axis represents the difference between adjacent autocorrelations AC(r+1)-AC(r). When the shift r is at 2 Hz, 4 Hz, the difference AC(r+1)-AC(r) is smaller, corresponding to peaks in the autocorrelations AC(r) for the resonance frequencies at 2 Hz, 4 Hz in FIG. 10. Using the difference AC(r+1)-AC(r) between adjacent autocorrelations may indicate the magnitude of each resonance frequency. The stronger the resonance frequency is, the smaller the difference AC(r+1)-AC(r) will be. FIG. 11 shows that the minimum difference is approximately −0.2. The processor 12 may input the 1D combined cadence spectrum data and the minimum autocorrelation into the classifier 120 to classify the object O accordingly. Different objects O may have different minimum values of autocorrelation differences. For example, the minimum value of autocorrelation differences of humans may be about −0.2, and the minimum value of autocorrelation differences of dogs may be about −0.05.

The processor 12 may use the velocity-normalized cadence spectrum data as the cadence feature to identify the object O. Using the velocity-normalized cadence spectrum data may remove or reduce the cadence features variation of the same object resulting from different velocities, for example, remove or reduce the difference in cadence features generated by people's slow walk and fast walk. First, the processor 12 may identify the time window of the torso velocity Vt corresponding to the time index mt from the Doppler spectrogram data, and the time window of the adjacent maximum velocity Vm corresponding to the time index mm. The processor 12 may also compute the difference between the time index mt and the time index mm to derive the velocity normalization interval d. For example, if the time index mt is 11 and the time index mm is 1, the velocity normalization interval d may be derived as d=11−1=10. The processor 12 may divide each matrix element s[m,h] of the Doppler spectrogram matrix Dm in Equation 4 by the corresponding matrix element s[m+d,h] to generate a velocity normalization matrix Dm_vn1, d being the velocity normalization interval, and the velocity normalization matrix Dm_vn1 being expressed by Equation 15:

$$Dm\_vn1 = \begin{bmatrix} s\left[0, \frac{L}{2}\right]/s\left[d, \frac{L}{2}\right] & \cdots & s\left[M-1-d, \frac{L}{2}\right]/s\left[M-1, \frac{L}{2}\right] \\ \vdots & \ddots & \vdots \\ s[0,1]/s[d,1] & \cdots & s[M-1-d,1]/s[M-1,1] \\ s[0,-1]/s[d,-1] & \cdots & s[M-1-d,-1]/s[M-1,-1] \\ \vdots & \ddots & \vdots \\ s\left[0,-\frac{L}{2}\right]/s\left[d,-\frac{L}{2}\right] & \cdots & s\left[M-1-d,-\frac{L}{2}\right]/s\left[M-1,-\frac{L}{2}\right] \end{bmatrix}$$

Equation 15

In some embodiments, the processor 12 may divide each matrix element s[m,h] of the Doppler spectrogram matrix Dm in Equation 4 by the corresponding matrix element s[m-d,h] to generate the velocity normalization matrix Dm_vn2, d being the velocity normalization interval, and the velocity normalization matrix Dm_vn2 being expressed by Equation 16:

$$Dm\_vn2 = \begin{bmatrix} s\left[d, \frac{L}{2}\right]/s\left[0, \frac{L}{2}\right] & \cdots & s\left[M-1, \frac{L}{2}\right]/s\left[M-1-d, \frac{L}{2}\right] \\ \vdots & \ddots & \vdots \\ s[d,1]/s[0,1] & \cdots & s[M-1,1]/s[M-d-1,1] \\ s[d,-1]/s[0,-1] & \cdots & s[M-1,-1]/s[M-1-d,-1] \\ \vdots & \ddots & \vdots \\ s\left[d,-\frac{L}{2}\right]/s\left[0,-\frac{L}{2}\right] & \cdots & s\left[M-1,-\frac{L}{2}\right]/s\left[M-1-d,-\frac{L}{2}\right] \end{bmatrix}$$

Equation 16

In addition, the processor 12 may scale the Doppler spectrogram data and the time axis in equal proportions, as expressed by Equation 17:

$$D = \frac{Vt}{Vm} \times \frac{d}{T}$$

Equation 17

Where D is the number of time indexes after being scaled in the sampling interval;
Vt is the torso velocity;
Vm is the maximum velocity;
d is the number of time indexes in the sampling interval; and
T is the total time in the sampling interval.

Figure 12:
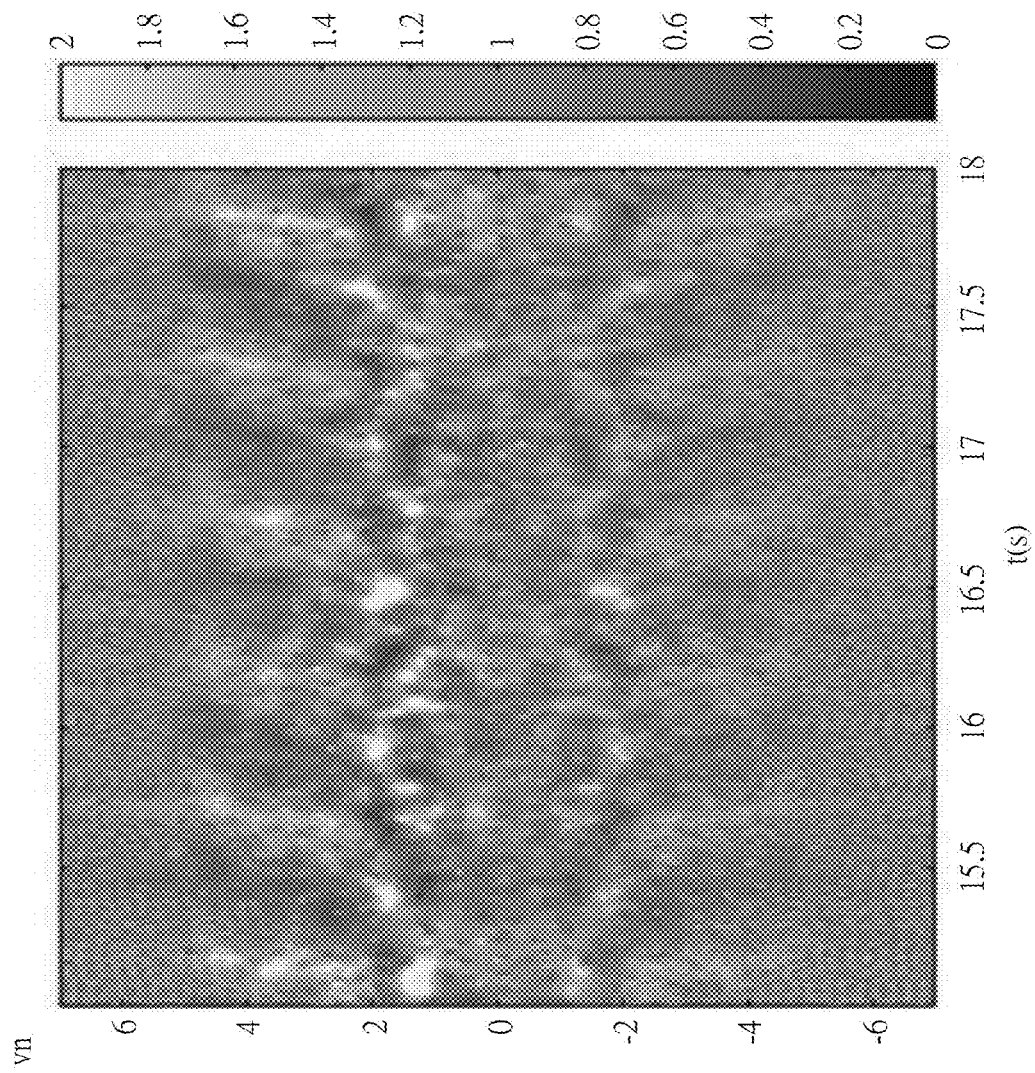
FIG. 12 shows a velocity-normalized Doppler spectrogram according to an embodiment of the invention.

FIG. 12 shows a velocity-normalized Doppler spectrogram according to an embodiment of the invention, where the horizontal axis represents time, and the vertical axis represents the normalized velocity vn. After the velocity is normalized, the energy corresponding to the torso velocity (2 m/s) in the Doppler spectrogram in FIG. 12 will be almost completely removed. The processor 12 may execute Steps S208 and S210 according to the velocity-normalized Doppler spectrogram data, and generate the 1D velocity-normalized cadence spectrum data. The processor 12 may use the 1D velocity-normalized cadence spectrum data as the cadence features, and input them into the classifier 120 to classify the object O.

The object recognition device 1 and the object recognition method 200 use a radar to receive echo signals to generate cadence spectrum data, and derive from the 2D cadence spectrum data, the ratio of the secondary energy to the primary energy, the stride length of the object, and the 1D cadence spectrum data, the combined cadence spectrum data and the minimum autocorrelation, or velocity-normalized cadence spectrum data as the cadence features, so as to enable the processor to recognize the target object in an automatic and fast manner.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object recognition method, comprising:
   performing a first time-frequency domain transform on an echo signal to generate Doppler spectrogram data, wherein the echo signal is associated with an object, and the Doppler spectrogram data is a time-frequency representation;
   performing a second frequency domain transform on N sets of time domain data corresponding to N velocities in the Doppler spectrogram data to generate N sets of cadence spectrum data, respectively, N being a positive integer, wherein the cadence spectrum data is a frequency domain representation;
   combining the N sets of cadence spectrum data to acquire combined cadence spectrum data; and
   acquiring a cadence feature from the combined cadence spectrum data to recognize the object,
   wherein combining the N sets of cadence spectrum data to acquire the combined cadence spectrum data comprises:
      normalizing the N sets of cadence spectrum data; and
      combining the N sets of normalized cadence spectrum data to acquire the combined cadence spectrum data.

2. The object recognition method of claim 1, wherein performing the first time-frequency domain transform on the echo signal to generate Doppler spectrogram data comprises:
   performing a preprocessing operation on the echo signal to generate a preprocessed signal; and
   transforming the preprocessed signal into the Doppler spectrogram data.

3. The object recognition method of claim 2, wherein transforming the preprocessed signal into the Doppler spectrogram data comprises:
   performing a short time Fourier transform (STFT) on the preprocessed signal to generate the Doppler spectrogram data.

4. The object recognition method of claim 2, wherein transforming the preprocessed signal into the Doppler spectrogram data comprises:
   performing a wavelet transform on the preprocessed signal to generate the Doppler spectrogram data.

5. The object recognition method of claim 1, wherein the object comprises a primary portion and a secondary portion, and acquiring the cadence feature from the combined cadence spectrum data to recognize the object comprises:
   identifying a fundamental frequency and a primary velocity of the primary portion from the combined cadence spectrum data;
   generating a stride according to the fundamental frequency and the primary velocity;
   identifying a secondary energy corresponding to the secondary portion and a primary energy corresponding to the primary portion from the combined cadence spectrum data;
   generating a ratio of the secondary energy to the primary energy; and
   recognizing the object according to the stride and the ratio.

6. The object recognition method of claim 1, wherein acquiring the cadence feature from the combined cadence spectrum data to recognize the object comprises:
   identifying a fundamental frequency and a harmonic frequency from the combined cadence spectrum data; and
   recognizing the object according to the fundamental frequency and the harmonic frequency.

7. The object recognition method of claim 1, further comprising:
   transmitting two types of transmission signals identical in frequency but out-of-phase by 90 degrees;
   wherein the N velocities comprise a plurality of positive velocities and a plurality of negative velocities.

8. The object recognition method of claim 1, wherein performing the second frequency domain transform on the N sets of time domain data corresponding to the N velocities in the Doppler spectrogram data to generate the N sets of cadence spectrum data, respectively comprises:
   generating M sets of combined Doppler spectrogram data according to M sets of positive velocity energies and M sets of negative velocity energies corresponding to M points in time in the Doppler spectrogram data, M being a positive integer; and
   transforming the N sets of time domain data corresponding to the N velocities in the M sets of combined Doppler spectrogram data into the N sets of cadence spectrum data, respectively.

9. The object recognition method claim 8, wherein generating the M sets of combined Doppler spectrogram data according to the M sets of energy in positive velocities and the M sets of energy in negative velocities corresponding to the M points in time in the Doppler spectrogram data comprises:
   adding the M sets of positive velocity energies to generate a total energy of positive velocities;
   adding the M sets of negative velocity energies to generate a total energy of negative velocities; and
   dividing an m-th set of velocity energies corresponding to a larger one of the total energy of positive velocities and the total energy of negative velocities to an m-th set of velocity energies corresponding to a smaller one of the total energy of positive velocities and the total energy of negative velocities to generate an m-th set of combined Doppler spectrogram data, wherein m is an integer and $0 \leq m < M$.

10. The object recognition method claim 8, wherein generating the M sets of combined Doppler spectrogram data according to the M sets of positive velocity energies and the M sets of negative velocity energies corresponding to the M points in time in the Doppler spectrogram data comprises:
    adding the M sets of positive velocity energies to generate a total energy of positive velocities;
    adding the M sets of negative velocity energies to generate a total energy of negative velocities; and
    generating the M sets of combined Doppler spectrogram data according to M sets of velocity energies corresponding to a larger one of the total energy of positive velocities and the total energy of negative velocities.

11. The object recognition method of claim 1, wherein acquiring the cadence feature from the combined cadence spectrum data to recognize the object comprises:
    performing an autocorrelation process on the combined cadence spectrum data to generate a plurality of autocorrelations; and recognizing the object according to a minimum difference in a plurality of differences between 2 adjacent ones of the plurality of autocorrelations.

12. The object recognition method of claim 1, further comprising performing a velocity normalization process on the Doppler spectrogram data according to a maximum velocity in the Doppler spectrogram data to generate velocity-normalized Doppler spectrogram data;
wherein performing the second frequency domain transform on the N sets of time domain data corresponding to the N velocities in the Doppler spectrogram data to generate the N sets of cadence spectrum data, respectively comprises:
transforming the N sets of time domain data corresponding to the N velocities in the velocity-normalized Doppler spectrogram data into the N sets of cadence spectrum data, respectively.

13. An object recognition device, comprising:
a radar configured to receive an echo signal, the echo signal being associated with an object; and
a processor coupled to the radar, and configured to perform a first time-frequency domain transform on an echo signal to generate Doppler spectrogram data, perform a second frequency domain transform on N sets of time domain data corresponding to N velocities in the Doppler spectrogram data to generate N sets of cadence spectrum data, respectively, combine the N sets of cadence spectrum data to acquire combined cadence spectrum data, and acquire a cadence feature from the combined cadence spectrum data to recognize the object, N being a positive integer, wherein the Doppler spectrogram data is a time-frequency representation, and the cadence spectrum data is a frequency domain representation,
wherein the object comprises a primary portion and a secondary portion, and the processor is further configured to:
identify a fundamental frequency and a primary velocity of the primary portion from the combined cadence spectrum data;
generate a stride according to the fundamental frequency and the primary velocity;
identify a secondary energy corresponding to the secondary portion and a primary energy corresponding to the primary portion from the combined cadence spectrum data;
generate a ratio of the secondary energy to the primary energy; and
recognize the object according to the stride and the ratio.

14. The object recognition device of claim 13, wherein the processor is further configured to:
identify the fundamental frequency and a harmonic frequency from the combined cadence spectrum data; and
recognize the object according to the fundamental frequency and the harmonic frequency.

15. The object recognition device of claim 13, wherein the processor is further configured to:
generate M sets of combined Doppler spectrogram data according to M sets of positive velocity energies and M sets of negative velocity energies corresponding to M points in time in the Doppler spectrogram data, M being a positive integer; and
transform the N sets of time domain data corresponding to the N velocities in the M sets of combined Doppler spectrogram data into the N sets of cadence spectrum data, respectively.

16. The object recognition device of claim 13, wherein the processor is further configured to:
perform an autocorrelation process on the combined cadence spectrum data to generate a plurality of autocorrelations; and
recognize the object according to a minimum difference in a plurality of differences between 2 adjacent ones of the plurality of autocorrelations.

17. The object recognition device of claim 13, wherein the processor is further configured to:
perform a velocity normalization process on the Doppler spectrogram data according to a maximum velocity in the Doppler spectrogram data to generate velocity-normalized Doppler spectrogram data; and
transform the N sets of time domain data corresponding to the N velocities in the velocity-normalized Doppler spectrogram data into the N sets of cadence spectrum data, respectively.

18. An object recognition device, comprising:
a radar configured to receive an echo signal, the echo signal being associated with an object; and
a processor coupled to the radar, and configured to generate Doppler spectrogram data according to the echo signal, transform N sets of time domain data corresponding to N velocities in the Doppler spectrogram data into N sets of cadence spectrum data, respectively, normalize the N sets of cadence spectrum data, combine the N sets of normalized cadence spectrum data to acquire combined cadence spectrum data and acquire a cadence feature from the combined cadence spectrum data to recognize the object, N being a positive integer.

* * * * *